United States Patent
Hong

(10) Patent No.: US 11,039,415 B2
(45) Date of Patent: Jun. 15, 2021

(54) DOWNLINK DATA TRANSMISSION METHOD, APPARATUS, AND DEVICE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/457,923

(22) Filed: Jun. 29, 2019

(65) Prior Publication Data

US 2019/0327708 A1   Oct. 24, 2019

Related U.S. Application Data

(63) Continuation of application No. PCT/CN2017/093694, filed on Jul. 20, 2017.

(30) Foreign Application Priority Data

Dec. 30, 2016   (CN) .......................... 201611263799.9

(51) Int. Cl.
*H04W 68/02* (2009.01)
*H04W 68/00* (2009.01)
*H04W 76/27* (2018.01)
*H04W 88/10* (2009.01)

(52) U.S. Cl.
CPC ......... *H04W 68/005* (2013.01); *H04W 68/02* (2013.01); *H04W 76/27* (2018.02); *H04W 88/10* (2013.01)

(58) Field of Classification Search
CPC ..... H04W 4/20; H04W 68/005; H04W 68/02; H04W 76/27; H04W 88/10; H04W 84/02; H04W 84/022; H04W 84/027
See application file for complete search history.

(56) References Cited

U.S. PATENT DOCUMENTS 10,334,657 B2 *  6/2019  Hong .................... H04W 48/20
10,367,677 B2 *  7/2019  Parkvall ............... H04J 11/0056
10,506,550 B2 * 12/2019  Kim ....................... H04W 68/02
10,638,373 B2 *  4/2020  Wei .................... H04W 36/0072
(Continued)

FOREIGN PATENT DOCUMENTS

CN         1997205 A      7/2007
CN       101047984 A     10/2007
(Continued)

OTHER PUBLICATIONS

InterDigital Communications, RAN Based Paging for New Radio Access, 3GPP TSG-RAN WG2 #95-BIS, Tdoc R2-166864, 3 pages, Oct. 2016.*

(Continued)

*Primary Examiner* — Frank Duong
(74) *Attorney, Agent, or Firm* — Syncoda LLC; Feng Ma

(57) ABSTRACT

A method for downlink data transmission includes: sending a paging message in a wireless notification area, the paging message carrying data need to be sent to a user equipment (UE); and receiving, after the data in the paging message is acquired by the UE, a receipt confirmation message returned by the UE, the receipt confirmation message being indicative of the UE successfully receiving the data.

20 Claims, 8 Drawing Sheets

(56) References Cited

U.S. PATENT DOCUMENTS

| | | | | |
|---|---|---|---|---|
| 2014/0155109 A1* | 6/2014 | Vaidya | ............... | H04W 8/06 |
| | | | | 455/458 |
| 2014/0302880 A1* | 10/2014 | Godin | ............... | H04W 68/02 |
| | | | | 455/458 |
| 2018/0049120 A1* | 2/2018 | Kelley | ............... | H04W 36/22 |
| 2018/0139778 A1* | 5/2018 | Chou | ............... | H04W 76/27 |
| 2018/0167883 A1* | 6/2018 | Guo | ............... | H04B 7/088 |
| 2019/0174570 A1* | 6/2019 | Fujishiro | ............... | H04W 92/12 |

FOREIGN PATENT DOCUMENTS

| | | | |
|---|---|---|---|
| CN | 101207840 A | 6/2008 | |
| CN | 101651850 A | 2/2010 | |
| CN | 102158959 A | 8/2011 | |
| CN | 102333293 A | 1/2012 | |
| CN | 105578440 A | 5/2016 | |
| CN | 106714126 A | 5/2017 | |
| WO | 2014111153 A1 | 7/2014 | |

OTHER PUBLICATIONS

Intel Corporation, RAN-based paging area for light connection, 3GPP TSG RAN WG2 Meeting #95bis, R2-166689, 6 pages, Oct. 2016.*

International Search Report in international application No. PCT/CN2017/093694, dated Jul. 5, 2018.

Office Action in CN application No. 201611263799.9, dated Jul. 17, 2018.

\* cited by examiner

DOWNLINK DATA TRANSMISSION METHOD, APPARATUS, AND DEVICE

CROSS-REFERENCE TO RELATED APPLICATIONS

This application is a Continuation Application of International Application No. PCT/CN2017/093694 filed on Jul. 20, 2017, which claims priority to Chinese Patent Application No. 201611263799.9 filed on Dec. 30, 2016. The disclosures of these applications are incorporated herein by reference in their entirety.

BACKGROUND

Mobile communication has experienced a leap-forward development from voice services to mobile bandwidth data services, which not only profoundly changed lifestyle of users, but also greatly promoted social and economic development. As the two main driving forces for the development of mobile communication in the future, the mobile Internet and the Internet of Things (IoT) provide a broad application scenario for 5G.

SUMMARY

The present disclosure relates to wireless network technologies, and more particularly, to a method, an apparatus and an equipment for downlink data transmission.

According to a first aspect of the present disclosure, there is provided a method for downlink data transmission, including: sending a paging message in a wireless notification area, the paging message carrying data need to be sent to a UE; and receiving a receipt confirmation message returned by the UE, the receipt confirmation message being indicative of the UE successfully receiving the data.

According to the solution provided by embodiments of the present disclosure, the base station may directly carry the downlink data that needs to be sent to the UE in the paging message for sending, that is, the paging message sent by the base station to the UE includes data, and the UE may directly obtain the data. In other words, the data can be obtained without necessity to establish the connection state, thus data transmission efficiency can be effectively improved and data transmission delay can be reduced.

In an embodiment, prior to the sending a paging message in a wireless notification area, the method further includes: receiving the paging message sent by another base station; or, acquiring paging signaling, and generating the paging message by adding data into the signaling.

In an embodiment, the method further includes: sending the paging message to another base station, causing the other base station to send the paging message in a corresponding notification area.

According to the solution provided by embodiments of the present disclosure, the paging message may be generated by the base station itself (i.e., the base station needs to send data to the UE), or may be received from other base stations. Specifically, the UE may move all the time, for example, go far away from the initial paging area. Accordingly, in order to send data to the UE more quickly, the base station may also page the UE through other surrounding base stations, and send the paging message carrying the downlink data of the UE to other base stations, causing other base stations to broadcast the paging message so that the UE can acquire the data more quickly.

In an embodiment, the method further includes: sending the receipt confirmation message to the other base station.

According to the solution provided by embodiments of the present disclosure, if the paging message broadcasted by the base station is received from other base stations, when receiving the receipt confirmation message returned by the UE, the base station may need to forward the receipt confirmation message to the base station that sends the paging message, so that the base station knows that the UE successfully received the data.

Based on any of forgoing solutions, prior to the sending a paging message in a wireless notification area, the method further comprises: determining the UE is currently in a wireless link inactive state.

The solution provided by embodiments of the present disclosure is generally applied to a UE in a Radio Resource Control (RRC) inactive state, that is, the RRC_INACTIVE state. When determining that the UE is in the RRC inactive state, the base station does not need to wake up the UE, that is, does not need to perform an RRC establishment procedure with the UE. Instead, the data to be sent is directly carried in the paging message, so the downlink data is transmitted while paging the UE, thereby effectively improving the data transmission efficiency and reducing the data transmission delay.

According to a second aspect of the present disclosure, there is provided a method for downlink data transmission, including: receiving, by a UE, a paging message sent by a base station; detecting whether the paging message carries data sent by a base station to the UE; acquiring the data and generating a receipt confirmation message if the paging message carries data, the receipt confirmation message being indicative of the UE successfully receiving the data; and sending the receipt confirmation message to the base station.

In an embodiment, the method further includes: initiating, if the paging message does not carry data, an establishment procedure of a wireless resource link with the base station.

According to the solution provided by embodiments of the present disclosure, when receiving the paging message from the base station, the UE detects whether the paging message carries the downlink data sent to the UE, and the data may be identified with an identifier corresponding to the UE. If the data is included, the UE may acquire the data by decoding and generate the reception confirmation message to be returned to the base station. Otherwise, the UE may initiate the wireless link establishment procedure according to the paging instruction, so as to establish the wireless link for data transmission. In this way, the data transmission efficiency can be effectively improved, and the data transmission delay can be reduced.

According to a third aspect of the present disclosure, there is provided an apparatus for downlink data transmission, including: a first sending module, configured to send a paging message in a wireless notification area, the paging message carrying data required to be sent to a user equipment (UE); and a first receiving module, configured to receive a receipt confirmation message returned by the UE, the receipt confirmation message being indicative of the UE successfully receiving the data.

In an embodiment, the apparatus further includes: a second receiving module, configured to receive the paging message sent by another base station; or, a first processing module, configured to acquire paging signaling, and generate the paging message by adding data into the signaling.

In an embodiment, the apparatus further includes: a second sending module, configured to send the receipt confirmation message to the other base station.

In an embodiment, the apparatus further includes: a third sending module, configured to send the paging message to another base station, causing the other base station to send the paging message in a corresponding notification area.

In an embodiment, the apparatus further includes: a second processing module, configured to determine the UE is currently in a wireless link inactive state.

According to a fourth aspect of the present disclosure, there is provided an apparatus for downlink data transmission, including: a receiving module, configured to receive a paging message sent by a base station; a first processing module, configured to detect whether the paging message carries data sent by a base station to the apparatus for downlink data transmission; and configured to acquire the data and generate a receipt confirmation message if the paging message carries data, the receipt confirmation message being indicative of the UE successfully receiving the data; and a sending module, configured to send the receipt confirmation message to the base station.

In an embodiment, the apparatus further includes: a second processing module; the second processing module is configured to initiate, if the paging message does not carry data, an establishment procedure of a wireless resource link with the base station.

According to a fifth aspect of the present disclosure, there is provided a base station, including: a memory configured to store processor-executable instructions, a processor configured to process an executable instruction, a receiver, and a transmitter; wherein the transmitter is configured to send a paging message in a wireless notification area, the paging message carrying data required to be sent to a user equipment (UE); and the receiver is configured to receive a receipt confirmation message returned by the UE, the receipt confirmation message being indicative of the UE successfully receiving the data.

According to a sixth aspect of the present disclosure, there is provided a UE, including: a memory configured to store processor-executable instructions, a processor configured to process an executable instruction, a receiver, and a transmitter; wherein the receiver is configured to receive a paging message sent by a base station; the processor is configured to: detect whether the paging message carries data sent by a base station to the UE; and acquire the data and generate a receipt confirmation message if the paging message carries data, the receipt confirmation message being indicative of the UE successfully receiving the data; and the transmitter is configured to send the receipt confirmation message to the base station.

According to the method, apparatus and equipment provided by the present disclosure, the base station may directly carry the downlink data that needs to be sent to the UE in the paging message for sending, that is, the paging message sent by the base station to the UE includes data. When receiving the paging message, the UE detects whether the paging message carries the downlink data sent to the UE. If the data is included, the UE may acquire the data directly. In other words, the data can be obtained without necessity to establish the connection state, thus data transmission efficiency can be effectively improved and data transmission delay can be reduced.

It is to be understood that the above general description and the following detailed description are intended to be illustrative and explanatory, rather than restricting the present disclosure.

BRIEF DESCRIPTION OF THE DRAWINGS

The accompanying drawings referred to in the specification are a part of this specification, and provide illustrative embodiments consistent with the disclosure and, together with the detailed description, serve to illustrate some embodiments of the disclosure.

DETAILED DESCRIPTION

Various embodiments of the present disclosure are described below with specific examples, and other advantages and effects of the present disclosure can be easily understood by those skilled in the field of technology from the contents disclosed in this specification. The following description refers to the accompanying drawings in which same numeral references in different drawings may represent the same or similar elements unless otherwise indicated. Apparently, the described embodiments are only a part of embodiments in the present disclosure, rather than all of them. The present disclosure can also be implemented or applied through different specific embodiments, and various details of the specification can also be modified or changed based on different viewpoints and applications without departing from the spirit of the present disclosure.

The inventors of the present disclosure have recognized that, with the data flow increasing by a thousand times, 100 billion device connections and diverse business needs will pose serious challenges to 5G system design. In the conventional Long-Term Evolution (LTE) network, when the base station needs to send downlink data to the user equipment (UE) in the idle state, the base station needs to perform network paging to the UE and establish data after the connection is established.

Figure 1:
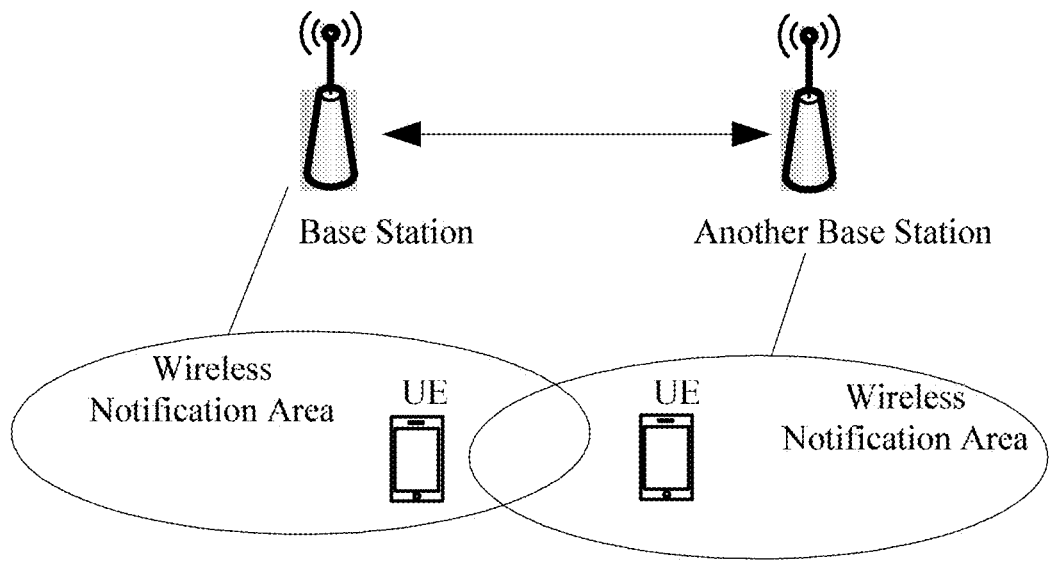
FIG. 1 is a schematic diagram illustrating an application scenario of the downlink data transmission method according to some embodiments.

FIG. 1 is a schematic diagram illustrating an application scenario of the downlink data transmission method according to some embodiments. The downlink data transmission method provided by the present disclosure may be applied between the base station and the UE. As shown in FIG. 1, the scenario may include multiple base stations and multiple UEs. The UE may move within the coverage of the base station, and may move to the wireless notification area of other base stations (one of other base stations is taken as an example in FIG. 1), that is, move within the coverage of other base stations. When the base station needs to perform downlink data transmission with the UE, the downlink data transmission method provided by the solution may be adopted, and the following technical solutions will be described with reference to the same UE.

Figure 2:
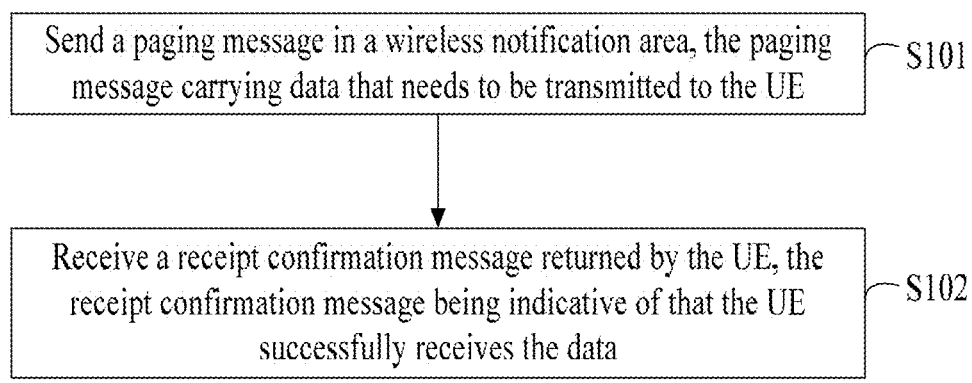
FIG. 2 is a flowchart illustrating Embodiment 1 of the downlink data transmission method according to some embodiments.

FIG. 2 is a flowchart illustrating Embodiment 1 of the downlink data transmission method according to some embodiments. As shown in FIG. 2, the method may be applied at the base station side, the base station may include a macro base station, a micro base station, a radio remote station, a repeater station, or an indoor distribution system, and the like, and the disclosure is not limited thereto.

The downlink data transmission method can include the following steps.

In step S101, a paging message is transmitted in a wireless notification area, the paging message carrying data that needs to be transmitted to the UE.

In step S102, a receipt confirmation message returned by the UE is received, the receipt confirmation message being indicative of that the UE successfully receives the data.

In the foregoing steps, when the data at the network side needs to be transmitted to a certain UE, the date may be directly sent to a UE in the connected state. If the UE is not connected or inactive, the downlink data to be sent may be carried in the paging message for transmission, which may be generally in a broadcasting way. The data may be identified with an identifier of the UE, so that the UE that receives the paging message is able to determine whether the data is sent to itself.

Optionally, in an example implementation of the solution, the manner in which the base station obtains the paging message may include at least the following two types.

In a first implementation manner, the paging message is received from another base station.

In a second implementation manner, paging signaling is obtained, and the data is added in the signaling to generate the paging message.

The meaning of the above two manners may be understood as follows. The base station may receive the paging message sent by another base station, which carries the paging instruction with respect to the UE and the downlink data to be sent to the UE. Optionally, the paging message may be generated by the base station itself. The paging message may be generated by adding the data to be sent in a paging instruction, which is generated with respect to the UE based on requirement of data transmission.

After the base station broadcasts the paging message by itself or broadcasts the paging message through other base stations, if the data is successfully acquired by the UE, a receipt confirmation message may need to be returned to the base station, so that the base station is able to determine that the UE has correctly received the downlink data.

The transmission method is preferably applied when the UE is in an inactive state.

According to the downlink data transmission method provided by embodiments of the present disclosure, the base station may directly carry the data in the paging message sent to the UE. The UE receiving the paging message may directly obtain the data. In other words, the data can be obtained without necessity to establish the connection state, thus data transmission efficiency can be effectively improved and data transmission delay can be reduced.

Figure 3:
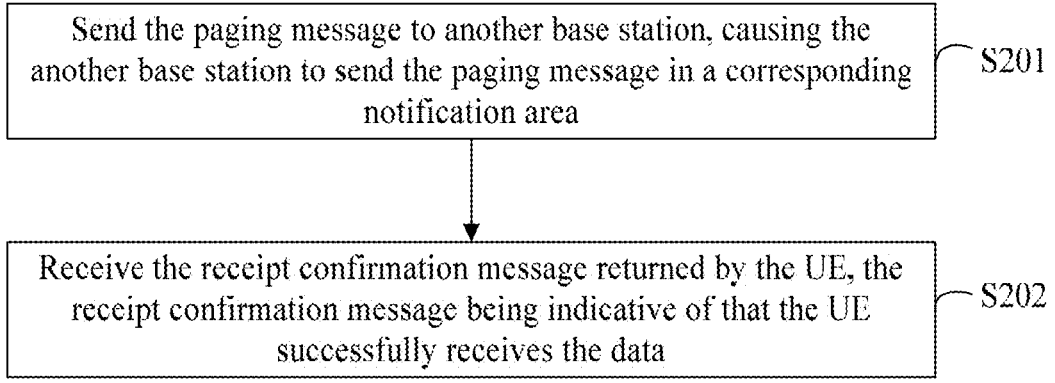
FIG. 3 is a flowchart illustrating Embodiment 2 of the downlink data transmission method according to some embodiments.

FIG. 3 is a flowchart illustrating Embodiment 2 of the downlink data transmission method according to some embodiments. As shown in FIG. 3, on the basis of forgoing Embodiment 1, another implementation manner of the downlink data transmission method includes the following steps.

In step S201, the paging message is sent to another base station, causing the other base station to send the paging message in a corresponding notification area.

In this step, the base station may send the paging message to one or more other surrounding base stations while broadcasting the paging message by itself, so that the other base station(s) may broadcast the paging message.

Optionally, the base station may also receive a paging message from another base station(s), and broadcast the paging message sent by the other base station(s), so that the data may be received by the UE quickly.

In step S202, the receipt confirmation message returned by the UE is received, the receipt confirmation message being indicative of that the UE successfully receives the data.

In this step, if the receipt confirmation message returned by the UE is received by another base station, the receipt confirmation message returned by the UE as received is obtained through forwarding of the other base station, that is, the base station receives the receipt confirmation message sent by the UE through the other base station.

Similarly, if the broadcasted paging message is from another base station and the receipt confirmation message returned by the UE is received, the receipt confirmation message needs to be sent to the other base station.

The UE may move all the time, for example, go far away from the initial paging area. Accordingly, in order to send data to the UE more quickly, the base station may also page the UE through other surrounding base stations, and send the paging message carrying the downlink data of the UE to other base stations, causing other base stations to broadcast the paging message so that the data can be acquired by the UE more quickly.

Similarly, the solution may be generally applied to a UE in the inactive state, that is, the RRC_INACTIVE state. When determining that the UE is in the Radio Resource Control (RRC) inactive state, the base station does not need to wake up the UE, that is, does not need to perform an RRC establishment procedure with the UE. Instead, the data to be sent is directly carried in the paging message, so the downlink data is transmitted while paging the UE, thereby effectively improving the data transmission efficiency and reducing the data transmission delay.

Figure 4:
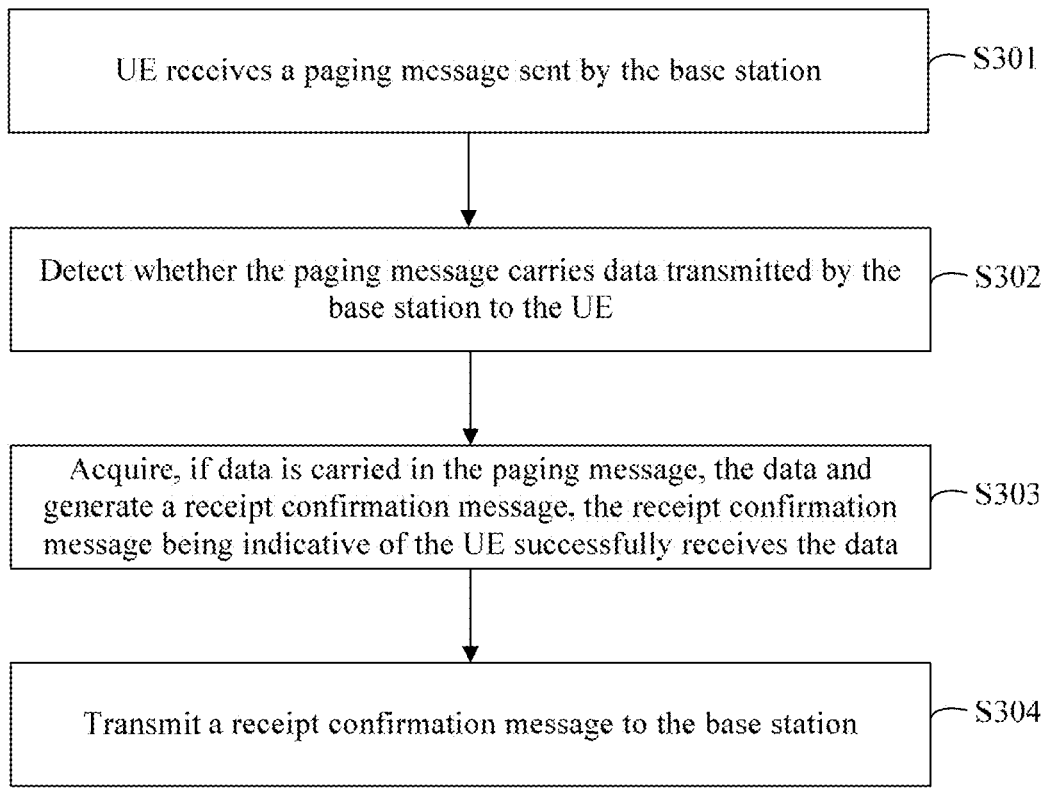
FIG. 4 is a flowchart illustrating Embodiment 3 of the downlink data transmission method according to some embodiments.

FIG. 4 is a flowchart illustrating Embodiment 3 of the downlink data transmission method according to some embodiments. As shown in FIG. 4, the solution may be applied at the user equipment side, and the user equipment may include any device requiring uplink and downlink data transmission, such as a mobile phone, a tablet computer, or the like. The downlink data transmission method may include following steps.

In step S301, the UE receives a paging message sent by the base station.

In step S302, it is detected whether the paging message carries data transmitted by the base station to the UE.

In step S303, if data is carried in the paging message, the data is acquired and a receipt confirmation message is generated, the receipt confirmation message being indicative of that the UE successfully receives the data.

In step S304, a receipt confirmation message is transmitted to the base station.

In this solution, the UE may be in the state without establishing a connection, or may be in the inactive state (also referred to as the light connection state), in which states the paging message of the base station can be received. The manner in which the base station sends the paging message may be broadcasting.

After receiving the paging message, the UE may need to detect whether the message carries any downlink data sent to the UE itself. If yes, the UE may directly obtain the data, and generate a receipt confirmation message to be returned to the base station, so that the base station acknowledges that the data is received by the UE. At the same time, an RRC link establishment may be performed according to a paging instruction in the paging message, so that data transmission can be performed subsequently.

If the paging message does not carry data sent to the UE, and the paging instruction therein indicates that the paging is for the UE, the UE may initiate an establishment procedure of wireless link according to the paging instruction, so as to establish the wireless link for data transmission.

According to the downlink data transmission method provided by embodiments of the present disclosure, when receiving the paging message from the base station, the UE detects whether the paging message carries the downlink data sent to the UE, and the data may be identified with an identifier corresponding to the UE. If the data is included, the UE may acquire the data by decoding and generate the reception confirmation message to be returned to the base station. Otherwise, the UE may initiate the wireless link establishment procedure according to the paging instruction, so as to establish the wireless link for data transmission. In this way, the data transmission efficiency can be effectively improved, and the data transmission delay can be reduced.

Based on the technical solutions of the foregoing embodiments, it is disclosed that the present disclosure provides a method for directly transmitting downlink data to a UE in the RRC_INACTIVE state.

When there is data at the network side to be transmitted to the UE in the RRC_INACTIVE state and the base station (referred to as gNB) decides to use the method for directly transmitting downlink data for the UE, the gNB may send radio paging signaling in the radio notification area to page the UE, and add the data that needs to be transmitted into the paging signaling for transmission together. In order to implement the paging, the gNB may send the paging signaling carrying the data information to all other gNBs in the wireless notification area, so that, upon receiving the paging signaling, the other gNBs may then broadcast the paging signaling within its own coverage.

After the radio paging signaling is received by a UE in the RRC_INACTIVE state, if the radio paging signaling carries a paging for the UE itself, the UE may further detect whether the paging signaling includes a data portion. If the data portion is included, then the UE may continue to receive the data sent to itself contained in the radio paging signaling. If there is no data portion included, then the UE may attempt to establish an RRC connection with the gNB. After receiving the data, the UE may further send a receipt confirmation signaling to the base station that sends the paging signaling, and the base station that receives the confirmation signaling may forwards the confirmation signaling to the gNB that initially sends the paging signaling, so that gNB may acknowledge that the data transmission is complete.

In this way, in the 5G network, the UE in the RRC_INACTIVE state is able to receive data without changing to the RRC_CONNECTED state, thereby increasing data transmission efficiency and reducing data transmission delay.

Figure 5:
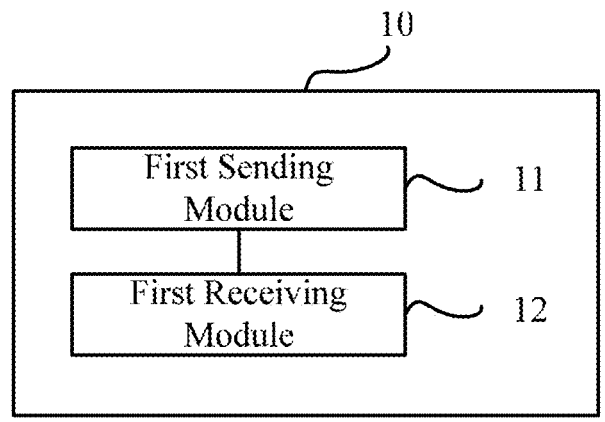
FIG. 5 is a block diagram illustrating Embodiment 1 of the downlink data transmission apparatus according to some embodiments.

FIG. 5 is a block diagram illustrating Embodiment 1 of the downlink data transmission apparatus according to some embodiments. As shown in FIG. 5, the downlink data transmission apparatus 10 provided in this embodiment includes a first sending module 11 and a first receiving module 12.

The various portions may have modular configurations, or are composed of discrete components, but nonetheless may be referred to as "modules."

The first sending module 11 is configured to send a paging message in a wireless notification area, the paging message carrying data required to be sent to a UE.

The first receiving module 12 is configured to receive a receipt confirmation message returned by the UE, the receipt confirmation message being indicative of the UE successfully receiving the data.

The downlink data transmission apparatus provided by the embodiment of the present disclosure is configured to perform the technical solution of the base station side according to any of the foregoing method embodiments. The implementation principles and the technical solutions of the apparatus and of the method are similar to each other. That is, the downlink data that needs to be sent to the UE may be directly carried in the paging message for transmission, such that the UE is able to directly obtain the data. In other words, the data can be obtained without necessity to establish the connection state, thus data transmission efficiency can be effectively improved and data transmission delay can be reduced.

Figure 6:
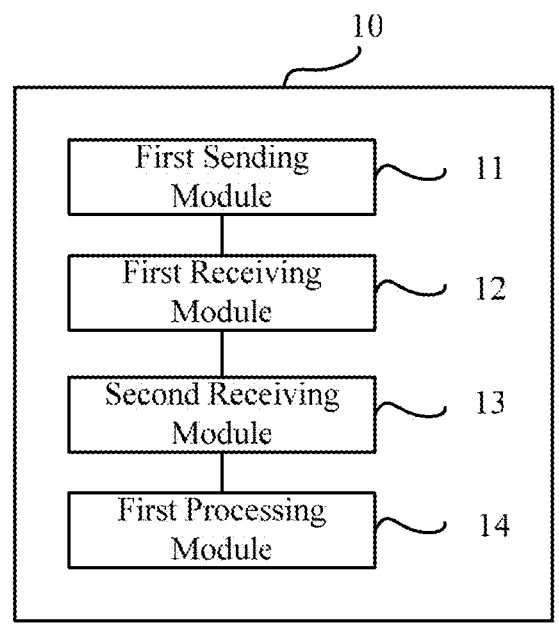
FIG. 6 is a block diagram illustrating Embodiment 2 of the downlink data transmission apparatus according to some embodiments.

On the basis of the embodiment shown in FIG. 5, FIG. 6 illustrates a block diagram of Embodiment 2 of the downlink data transmission apparatus according to some embodiments. Referring to FIG. 6, the downlink data transmission apparatus 10 further includes a second receiving module 13 or a first processing module 14.

The second receiving module 13 is configured to receive the paging message sent by another base station.

The first processing module 14 is configured to acquire paging signaling, and generate the paging message by adding data into the signaling.

Figure 7:
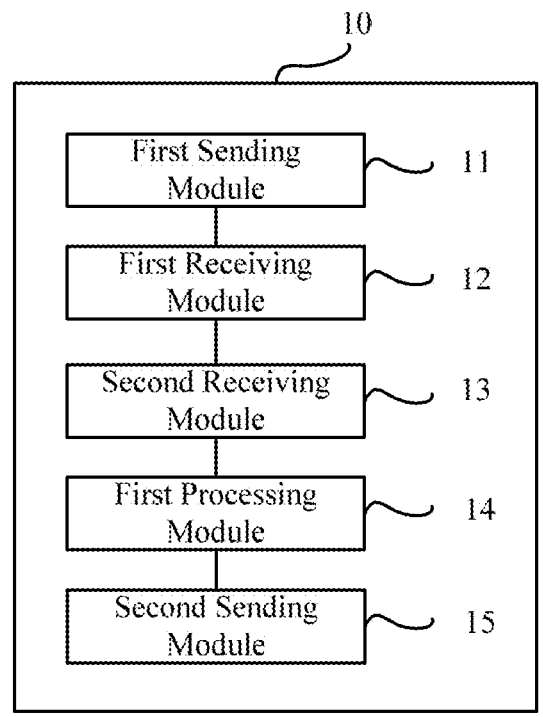
FIG. 7 is a block diagram illustrating Embodiment 3 of the downlink data transmission apparatus according to some embodiments.

On the basis of the embodiment shown in FIG. 6, FIG. 7 illustrates a block diagram of Embodiment 3 of the downlink data transmission apparatus according to some embodiments. Referring to FIG. 7, the downlink data transmission apparatus 10 further includes a second sending module 15.

The second sending module 15 is configured to send the receipt confirmation message to the other base station.

Figure 8:
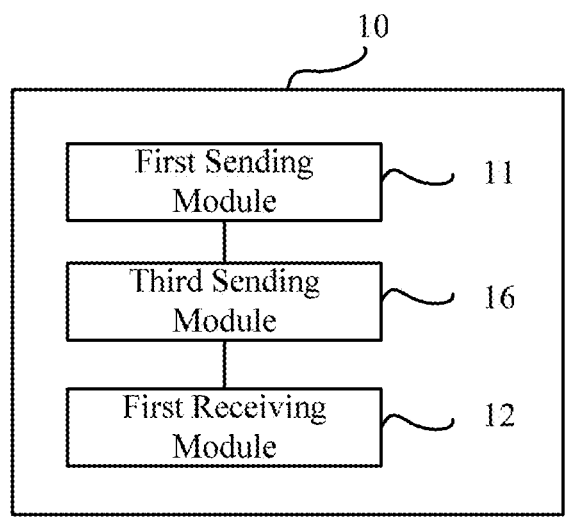
FIG. 8 is a block diagram illustrating Embodiment 4 of the downlink data transmission apparatus according to some embodiments.

On the basis of the embodiment shown in FIG. 5, FIG. 8 illustrates a block diagram of Embodiment 4 of the downlink data transmission apparatus according to some embodiments. Referring to FIG. 8, the downlink data transmission apparatus 10 further includes a third sending module 16.

The third sending module 16 is configured to send the paging message to another base station, causing the other base station to send the paging message in a corresponding notification area.

The downlink data transmission apparatus provided by any embodiment of the present disclosure is configured to perform the technical solution of the base station side according to any of the foregoing method embodiments. The implementation principles and the technical solutions of the apparatus and of the method are similar to each other. That is, the paging message carrying the downlink data of the UE may be sent to other base station(s), so that other base station(s) may broadcast the paging message. In other words, the paging message sent by other base station(s) is obtained and received for broadcasting, thereby enable the data to be received by the UE more quickly.

Figure 9:
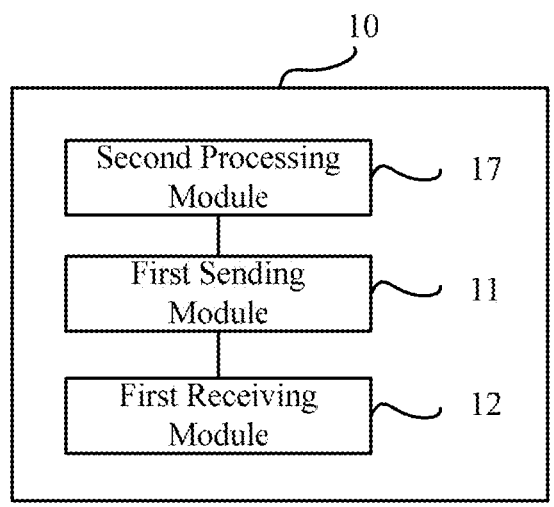
FIG. 9 is a block diagram illustrating Embodiment 5 of the downlink data transmission apparatus according to some embodiments.

On the basis of the embodiment shown in any one of FIGS. 5-8, FIG. 9 illustrates a block diagram of Embodiment 5 of the downlink data transmission apparatus according to some embodiments. Referring to FIG. 9, the downlink data transmission apparatus 10 further includes a second processing module 17.

The second processing module 17 is configured to determine that the UE is currently in a wireless link inactive state.

The downlink data transmission apparatus provided by the embodiment of the present disclosure is configured to perform the technical solution of the base station side according to any of the foregoing method embodiments. The implementation principles and the technical solutions of the apparatus and of the method are similar to each other. That is, the solution may be generally applied to a UE in the inactive state, that is, the RRC_INACTIVE state. When determining that the UE is in the RRC inactive state, the base station does not need to wake up the UE, that is, does not need to perform an RRC establishment procedure with the UE. Instead, the data to be sent is directly carried in the paging message, so the downlink data is transmitted while paging the UE, thereby effectively improving the data transmission efficiency and reducing the data transmission delay.

Figure 10:
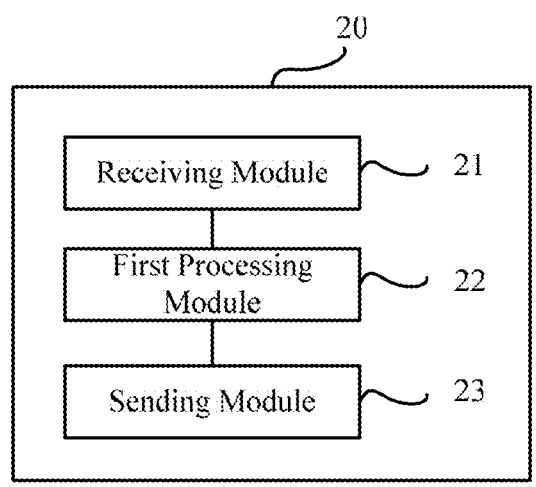
FIG. 10 is a block diagram illustrating Embodiment 6 of the downlink data transmission apparatus according to some embodiments.

FIG. 10 is a block diagram illustrating Embodiment 6 of the downlink data transmission apparatus according to some embodiments. Referring to FIG. 10, the downlink data transmission apparatus 20 includes a receiving module 21, a first processing module 22 and a sending module 23.

The receiving module 21 is configured to receive a paging message sent by a base station.

The first processing module 22 is configured to detect whether the paging message carries data sent by a base station to the apparatus for downlink data transmission; and configured to acquire the data and generate a receipt confirmation message if the paging message carries data, the receipt confirmation message being indicative of the UE successfully receiving the data.

The sending module 23 is configured to send the receipt confirmation message to the base station.

Figure 11:
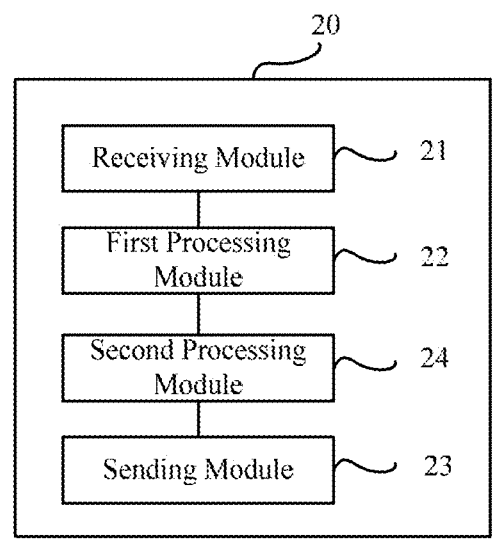
FIG. 11 is a block diagram illustrating Embodiment 7 of the downlink data transmission apparatus according to some embodiments.

FIG. 11 is a block diagram illustrating Embodiment 7 of the downlink data transmission apparatus according to some embodiments. Referring to FIG. 11, the downlink data transmission apparatus 20 further includes: a second processing module 24.

The second processing module 24 is configured to initiate, if the paging message does not carry data, an establishment procedure of a wireless resource link with the base station.

The downlink data transmission apparatus provided by the embodiment shown in FIGS. 10 and 11 of the present disclosure is configured to perform the technical solution of the UE side according to any of the foregoing method embodiments. The implementation principles and the technical solutions of the apparatus and of the method are similar to each other. That is, when receiving the paging message from the base station, the UE detects whether the paging message carries the downlink data sent to the UE. If the data is included, the UE may acquire the data by decoding and generate the reception confirmation message to be returned to the base station. Otherwise, the UE may initiate the wireless link establishment procedure according to the paging instruction, so as to establish the wireless link for data transmission. In this way, the data transmission efficiency can be effectively improved, and the data transmission delay can be reduced.

With regard to the downlink data transmission apparatus in each of the above embodiments, the specific manner in which the respective modules perform the operations has been described in detail in the embodiment related to the method, and will not be described in detail herein. That is, the internal functional modules and structural diagrams of the base station and the UE are described above.

Figure 12:
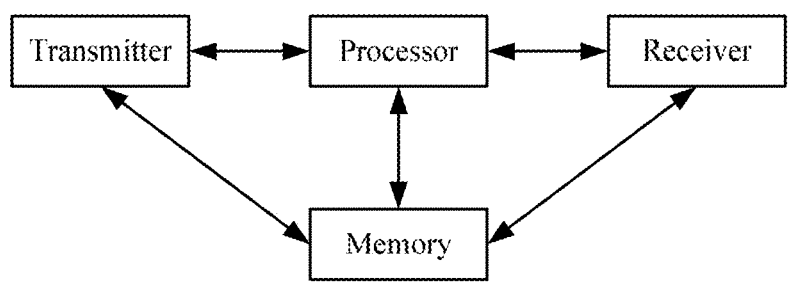
FIG. 12 is a block diagram illustrating an entity of the base station according to some embodiments.

FIG. 12 is a block diagram illustrating an entity of the base station according to some embodiments. Referring to FIG. 12, the base station may be specifically implemented as including: a memory configured to store processor-executable instructions, a processor configured to process an executable instruction, a receiver, and a transmitter.

The transmitter is configured to send a paging message in a wireless notification area, the paging message carrying data need to be sent to UE.

The receiver is configured to receive a receipt confirmation message returned by the UE, the receipt confirmation message being indicative of that the UE successfully receiving the data.

Figure 13:
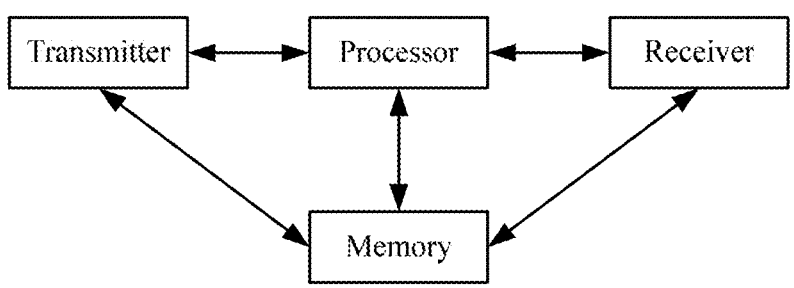
FIG. 13 is a block diagram illustrating an entity of the UE according to some embodiments.

FIG. 13 is a block diagram illustrating an entity of the UE according to some embodiments. Referring to FIG. 13, the UE may be specifically implemented as including: a memory configured to store processor-executable instructions, a processor configured to process an executable instruction, a receiver, and a transmitter.

The receiver is configured to receive a paging message sent by the base station.

The processor is configured to: detect whether the paging message carries data sent by a base station to the UE; and acquire the data and generate a receipt confirmation message if the paging message carries data, the receipt confirmation message being indicative of the UE successfully receiving the data;

The transmitter is configured to transmit the receipt confirmation message to the base station.

In the foregoing entity embodiments of the base station and the user equipment, it should be understood that the processor may be a central processing unit (CPU), or may be other general-purpose processors and digital signal processors (DSP), application specific integrated circuit (ASIC), and the like. The general-purpose processor may be a microprocessor or the processor may be any conventional processor or the like. The foregoing memory may be a read-only memory (ROM), a random-access memory (RAM), flash memory, hard disk or solid-state disk. The steps of the method disclosed in the embodiments of the present disclosure may be directly implemented as a hardware processor, or may be performed by a combination of hardware and software modules in the processor.

Figure 14:
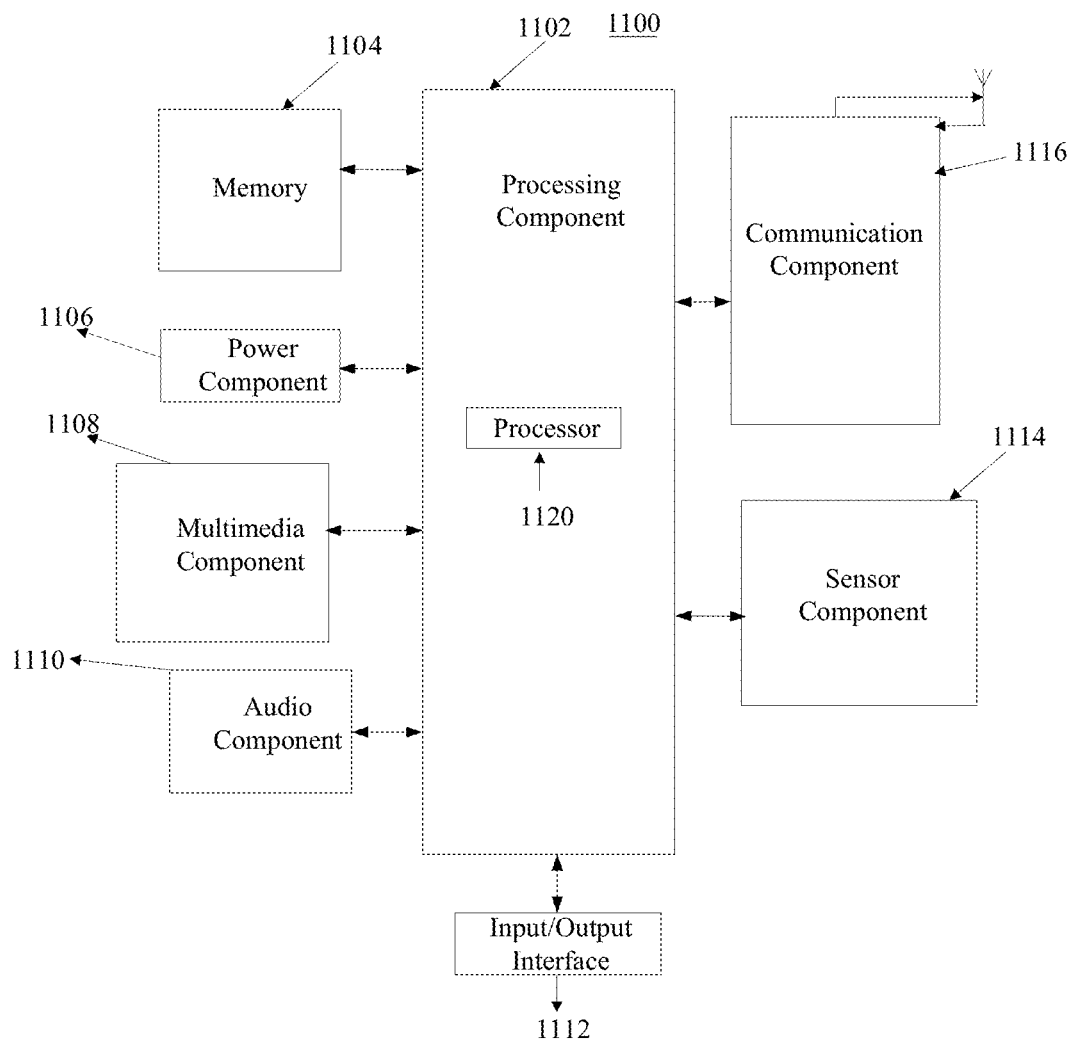
FIG. 14 is a block diagram illustrating a base station according to some embodiments.

FIG. 14 is a block diagram illustrating a base station 1100 according to some embodiments. For example, the base station may be a station of any types such as a macro base station, a micro base station, a radio remote station, a repeater station, an indoor distribution system, and the like.

Referring to FIG. 14, the base station 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the base station 1100, such as the operations associated with display, telephone calls, data communications, camera operations, and recording operations. The processing component 1102 may include one or more processors 1120 to execute instructions to perform all or part of the steps in the above described methods. Moreover, the processing component 1102 may include one or more modules which facilitate the interaction between the processing component 1102 and other components.

For instance, the processing component 1102 may include a multimedia module to facilitate the interaction between the multimedia component 1108 and the processing component 1102.

The memory 1104 is configured to store various types of data to support the operation of the base station 1100. Examples of such data include instructions for any applications or methods operated on the base station 1100, various types of data, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the base station 1100. The power component 1106 may include a power management system, one or more power sources, and any other components associated with the generation, management, and distribution of power in the base station 1100.

The multimedia component 1108 includes a screen providing an output interface between the base station 1100 and the user. In some embodiments, the screen may include a liquid crystal display (LCD), a light-emitting diode (LED) display such as an organic light-emitting diode (OLED) display, etc., and a touch panel (TP).

If the screen includes a touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action.

The audio component 1110 is configured to output and/or input audio signals. For example, the audio component 1110 includes a microphone ("MIC") configured to receive an external audio signal when the base station 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like.

The sensor component 1114 includes one or more sensors to provide status assessments of various aspects of the base station 1100. For instance, the sensor component 1114 may detect an open/closed status of the base station 1100, relative positioning of components, e.g., the display and the keypad, of the base station 1100, a change in position of the base station 1100 or a component of the base station 1100, a presence or absence of user contact with the base station 1100, an orientation or an acceleration/deceleration of the base station 1100, and a change in temperature of the base station 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an acceleration sensor, a gyroscope sensor, a magnetic sensor, a pressure sensor, or a temperature sensor. The sensor component 1114 may also include a fingerprint recognition sensor.

The communication component 1116 is configured to facilitate communication, wired or wirelessly, between the base station 1100 and other devices. The base station 1100 can access a wireless network based on a communication standard, such as Wi-Fi, 2G, or 3G, or a combination thereof. In one exemplary embodiment, the communication component 1116 receives a broadcast signal or broadcast associated information from an external broadcast management system via a broadcast channel.

In some embodiments, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the base station 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the forgoing downlink data transmission method, including: sending a paging message in a wireless notification area, the paging message carrying data need to be sent to a user equipment (UE); and receiving a receipt confirmation message returned by the UE, the receipt confirmation message being indicative of the UE successfully receiving the data.

Implementations of the subject matter and the operations described in this disclosure can be implemented in digital electronic circuitry, or in computer software, firmware, or hardware, including the structures disclosed herein and their structural equivalents, or in combinations of one or more of them.

Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this disclosure can be implemented as operations performed by a data processing apparatus on data stored on one or more computer-readable storage devices or received from other sources.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the UE can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

In some embodiments, there is also provided a non-transitory computer readable storage medium comprising instructions, such as a memory 1104 including instructions executable by the processor 1120 of the base station 1100 to perform the above method. For example, the non-transitory computer readable storage medium may be a ROM, a random-access memory (RAM), a CD-ROM, a magnetic tape, a floppy disk, and an optical data storage device.

Figure 15:
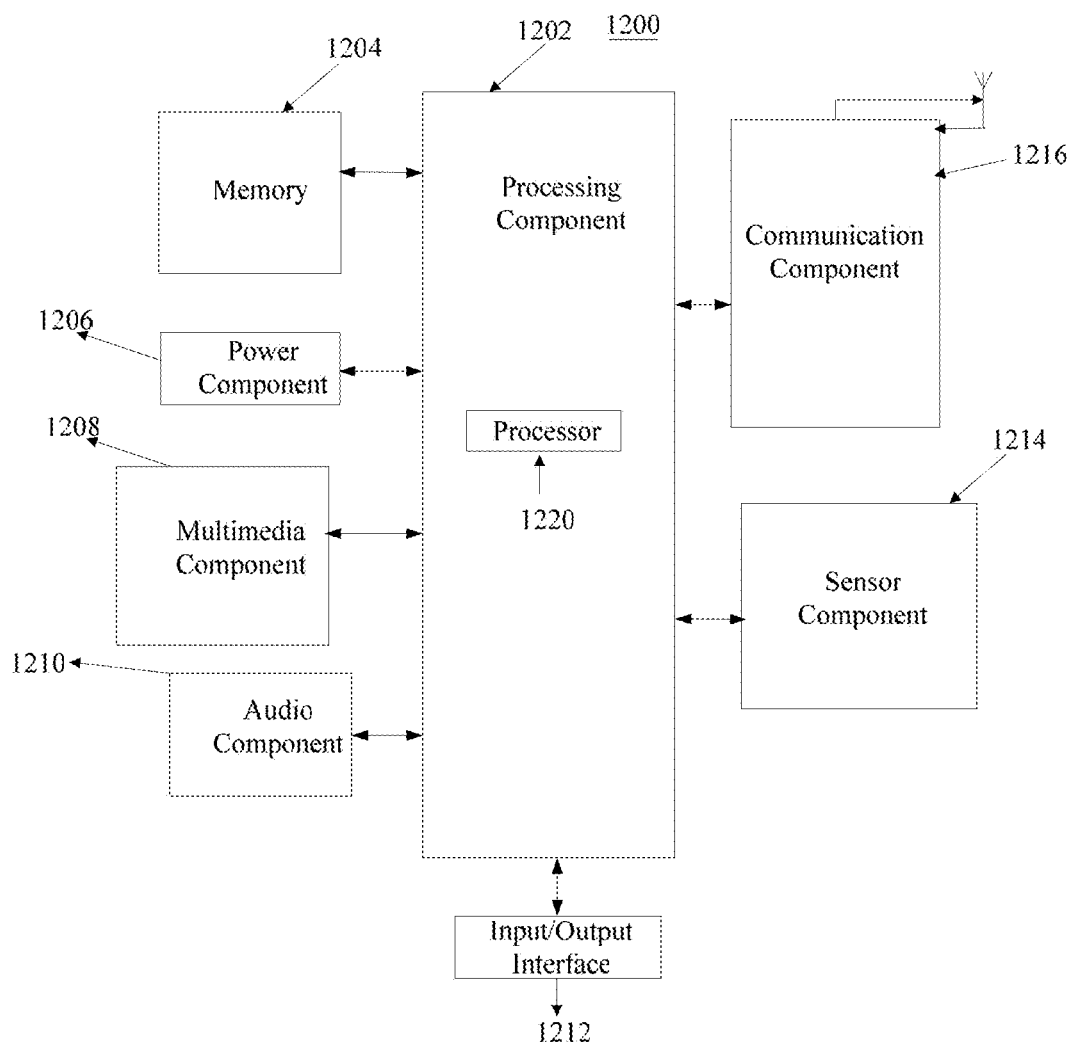
FIG. 15 is a block diagram illustrating a UE, according to some embodiments.

FIG. 15 is a block diagram illustrating a UE 1200, according to some embodiments. For example, the terminal device may be a smart phone, a computer, a transceiver device, a tablet device, or the like, which may require data transmission through a 3GPP network.

Referring to FIG. 15, the UE 1200 may include one or more of the following components: a processing component 1202, a memory 1204, a power component 1206, a multi-media component 1208, an audio component 1210, an input/output (I/O) interface 1212, a sensor component 1214, and a communication component 1216.

The processing component 1202 typically controls overall operations of the UE 1200, such as the operations associated with display, telephone calls, data communications, camera operations, and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For example, the processing component 1202 may include a multimedia module to facilitate the interaction between the multimedia component 1208 and the processing component 1202.

The memory device 1204 is configured to store various types of data to support the operation of the UE 1200. Examples of such data include instructions for any applications or methods operated on the UE 1200, various types of data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the UE 1200. The power component 1206 may include a power management system, one or more power sources, and any other components associated with the generation, management, and distribution of power in the UE 1200.

The multimedia component 1208 includes a screen providing an output interface between the UE 1200 and the user. In some embodiments, the screen may include an LCD display, LED display, or OLED display, and a touch panel (TP). If the screen includes a touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action.

The audio component 1210 is configured to output and/or input audio signals. For example, the audio component 1210 includes a microphone ("MIC") configured to receive an external audio signal when the UE 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like.

The sensor component 1214 includes one or more sensors to provide status assessments of various aspects of the UE 1200. For instance, the sensor component 1214 may detect an open/closed status of the UE 1200, relative positioning of components, e.g., the display and the keypad, of the UE 1200, a change in position of the UE 1200 or a component of the UE 1200, a presence or absence of user contact with the UE 1200, an orientation or an acceleration/deceleration of the UE 1200, and a change in temperature of the UE 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an acceleration sensor, a gyroscope sensor, a magnetic sensor, a pressure sensor, or a temperature sensor. The sensor component 1214 may also include a fingerprint recognition sensor.

The communication component 1216 is configured to facilitate communication, wired or wirelessly, between the UE 1200 and other devices. The UE 1200 can access a wireless network based on a communication standard, such as Wi-Fi, 2G, or 3G, or a combination thereof. In one exemplary embodiment, the communication component 1216 receives a broadcast signal or broadcast associated information from an external broadcast management system via a broadcast channel. In one exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the UE 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the forgoing downlink data transmission method, including: receiving, by the UE, a paging message sent by a base station; detecting whether the paging message carries data sent by a base station to the UE; acquiring the data and generating a receipt confirmation message if the paging message carries data, the receipt confirmation message being indicative of the UE successfully receiving the data; and sending the receipt confirmation message to the base station.

In some embodiments, there is also provided a non-transitory computer readable storage medium comprising instructions, such as a memory 1204 including instructions executable by processor 1220 of user device 1200 to perform the above method. For example, the non-transitory computer readable storage medium may be a ROM, a random-access memory (RAM), a CD-ROM, a magnetic tape, a floppy disk, and an optical data storage device.

Processors suitable for the execution of the instructions include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method for downlink data transmission, comprising:
   sending, from a base station, a paging message in a wireless notification area, the paging message carrying downlink data need to be sent to user equipment (UE) and an identifier of the UE without establishing a connection between the base station and UE, wherein the downlink data are identified with the identifier of the UE; and
   receiving a receipt confirmation message returned by the UE, the receipt confirmation message being indicative of the UE successfully receiving the downlink data.

2. The method according to claim 1, wherein, prior to the sending, from the base station, the paging message in a wireless notification area, the method further comprises:
   receiving the paging message sent by another base station; or,
   acquiring paging signaling, and generating the paging message by adding data into the paging signaling.

3. The method according to claim 1, wherein, prior to the sending, from the base station, the paging message in a wireless notification area, the method further comprises:
receiving the paging message sent by another base station.

4. The method according to claim 3, wherein the method further comprises:
sending the receipt confirmation message to the other base station.

5. The method according to claim 1, wherein the method further comprises:
sending the paging message to another base station, causing the other base station to send the paging message in a notification area corresponding to the other base station.

6. The method according to claim 1, wherein prior to the sending, from the base station, the paging message in a wireless notification area, the method further comprises:
determining the UE is currently in a wireless link inactive state.

7. The method according to claim 6, wherein the wireless link inactive state is a radio resource control (RRC) inactive state.

8. The method according claim 7, further comprising broadcasting the paging message.

9. The method according to claim 8, wherein the broadcasting comprises broadcasting to other base stations.

10. A method for downlink data transmission, comprising:
receiving, by user equipment (UE), a paging message sent by a first base station;
acquiring, in response to detecting the paging message carrying downlink data and an identifier of the UE sent by a second base station to the UE without establishing a connection between the base second station and UE, wherein the downlink data are identified with the identifier of the UE, the downlink data, and generating a receipt confirmation message indicative of the UE successfully receiving the downlink data; and
sending the receipt confirmation message to the first base station,
wherein the first base station and the second base station correspond to one base station or two base stations.

11. The method according to claim 10, further comprising:
initiating, in response to detecting the paging message not carrying data, an establishment procedure of a wireless resource link between the UE and the first base station.

12. The method according to claim 11, wherein the first base station and the second base station are different base stations, the method further comprising:
broadcasting the paging message from the first base station to a plurality of other base stations.

13. A base station, comprising:
a memory device configured to store processor-executable instructions;
a processor configured to process the instructions;
a receiver; and
a transmitter;
wherein:
the transmitter is configured to send a paging message in a wireless notification area, the paging message carrying downlink data need to be sent to user equipment (UE) and an identifier of the UE without establishing a connection between the base station and UE, wherein the downlink data are identified with the identifier of the UE; and
the receiver is configured to receive a receipt confirmation message returned by the UE, the receipt confirmation message being indicative of the UE successfully receiving the downlink data.

14. The base station according to claim 13, wherein, the receiver is further configured to receive the paging message sent by another base station.

15. The base station according to claim 14, wherein the transmitter is further configured to send the receipt confirmation message to the other base station.

16. The base station according to claim 13, wherein, the processor is configured to acquire paging signaling, and generate the paging message by adding data into the paging signaling.

17. The base station according to claim 16, wherein the transmitter is further configured to send the receipt confirmation message to the other base station.

18. The base station according to claim 13, wherein the transmitter is further configured to send the paging message to another base station, causing the other base station to send the paging message in a notification area corresponding to the other base station.

19. The base station according to claim 13, wherein the processor is configured to determine the UE is currently in a wireless link inactive state.

20. The base station according to claim 19, wherein the transmitter is configured to:
transmit the paging message carrying the downlink data to the UE in the wireless link inactive state for the UE to decode the downlink data, thereby reducing a communication delay; and
broadcast the paging message carrying the downlink data to a plurality of other base stations.

* * * * *